United States Patent
Konada et al.

(10) Patent No.: US 12,092,449 B2
(45) Date of Patent: Sep. 17, 2024

(54) PREVIEW ROAD SURFACE DETECTION DEVICE

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 307 days.

(21) Appl. No.: 17/682,263

(22) Filed: Feb. 28, 2022

(65) Prior Publication Data

US 2022/0290987 A1      Sep. 15, 2022

(30) Foreign Application Priority Data

Mar. 15, 2021   (JP) .................................. 2021-041694

(51) Int. Cl.
*G01B 21/30*      (2006.01)
*B60G 17/016*    (2006.01)
(Continued)

(52) U.S. Cl.
CPC .............. *G01B 21/30* (2013.01); *G01S 13/08* (2013.01); *B60G 17/0161* (2013.01);
(Continued)

(58) Field of Classification Search
None
See application file for complete search history.

(56) References Cited

U.S. PATENT DOCUMENTS

| 6,233,510 B1 * | 5/2001 | Platner ................... B60G 13/16 382/104 |
| 9,533,539 B2 * | 1/2017 | Eng ....................... B60G 17/019 |

(Continued)

FOREIGN PATENT DOCUMENTS

| JP | S59-144406 U | 9/1984 |
| JP | S62-115612 U | 7/1987 |

(Continued)

OTHER PUBLICATIONS

Office Action received in corresponding Japanese application No. 2021-041694 dated Aug. 2, 2022 with English translation (6 pages).

*Primary Examiner* — Patrick Assouad
*Assistant Examiner* — Mark A Shabman
(74) *Attorney, Agent, or Firm* — Rankin, Hill & Clark LLP

(57) ABSTRACT

A preview road surface detection device of a vehicle of the present invention includes: a distance sensor that is disposed in a vehicle member and detects a distance to a measurement point on a road surface nearer to a front part of the vehicle, corresponding to at least a central portion of a contact patch to the road surface of a wheel of the vehicle; and a distance calculator that calculates a road surface distance from the vehicle member to the measurement point, based on a value detected by the distance sensor. A displacement of the road surface nearer to the front part of the vehicle is detected as a road surface condition. The displacement of the road surface is calculated from the road surface distance and a vehicle height of the vehicle member when the distance sensor detects the distance.

1 Claim, 3 Drawing Sheets

(51) Int. Cl.
*B60G 17/0165* (2006.01)
*G01S 13/08* (2006.01)

(52) U.S. Cl.
CPC ...... *B60G 17/0162* (2013.01); *B60G 17/0165* (2013.01); *B60G 2400/821* (2013.01); *B60G 2401/21* (2013.01); *B60G 2600/172* (2013.01)

(56) References Cited

U.S. PATENT DOCUMENTS

| | | | |
|---|---|---|---|
| 2003/0154792 A1* | 8/2003 | Katayama | G01S 15/872 |
| | | | 73/602 |
| 2003/0156585 A1* | 8/2003 | Minami | G01C 9/00 |
| | | | 370/392 |
| 2009/0097038 A1* | 4/2009 | Higgins-Luthman | |
| | | | B60G 17/019 |
| | | | 356/602 |
| 2019/0118823 A1* | 4/2019 | Okuyama | G06T 7/70 |

FOREIGN PATENT DOCUMENTS

| | | |
|---|---|---|
| JP | H05-96922 A | 4/1993 |
| JP | H08-210828 A | 8/1996 |
| JP | 2003-307564 A | 10/2003 |
| JP | 2019-078648 A | 5/2019 |

* cited by examiner

PREVIEW ROAD SURFACE DETECTION DEVICE

CROSS REFERENCE TO RELATED APPLICATION

This application claims the benefit of Japanese Patent Application No. 2021-041694 filed on Mar. 15, 2021, the disclosure of which is incorporated herein by reference.

BACKGROUND OF THE INVENTION

1. Field of the Invention

The present invention relates to a preview road surface detection device of a vehicle for an active suspension.

2. Description of the Related Art

As one of active suspensions of a vehicle such as an automobile, an active suspension is known that includes: a road surface detection part that detects a displacement of a forward road surface, using an optical sensor; a vehicle speed detection part that detects a vehicle speed; a vertical acceleration detection part that is mounted to a vehicle body at a portion corresponding to a front wheel and detects a vertical acceleration of the vehicle body; and a storage part that stores therein information on the displacement on the road surface and the vertical acceleration in time series. When the detection of the displacement is not determined to be normal, a vertical acceleration at a portion corresponding to a rear wheel of the vehicle body when the vehicle travels by a distance corresponding to a wheelbase, is estimated from the vertical acceleration stored in the storage part, based on the wheelbase and a vehicle speed, and an actuator of the rear wheel is preview controlled in accordance with the estimated vertical acceleration.

RELATED ART DOCUMENT

Patent Document

[Patent Document 1] Japanese Laid-Open Patent Application, Publication No. H05-096922

SUMMARY OF THE INVENTION

Problem to be Solved by the Invention

The technique of Patent Document 1 does not take into account a case in which a tire is deformed when a vehicle of interest makes a turn or the like, which may cause an uncomfortable ride of an occupant of the vehicle.

In order to solve the problem described above, the present invention has been made in an attempt to, even when a tire is deformed when a vehicle makes a turn or the like, an active suspension is preview controlled based on a displacement of a road surface on which the vehicle is traveling, which is detected by a preview road surface detection device.

Means for Solving the Problem

In order to solve the problem described above, a preview road surface detection device of a vehicle of the present invention includes: a distance sensor that is disposed in a vehicle member and detects a distance to a measurement point on a road surface nearer to a front part of the vehicle, corresponding to at least a central portion of a contact patch to the road surface of a wheel of the vehicle; and a distance calculator that calculates a road surface distance from the vehicle member to the measurement point, based on a value detected by the distance sensor. A displacement of the road surface nearer to the front part of the vehicle is detected as a road surface condition. The displacement of the road surface is calculated from the road surface distance and a vehicle height of the vehicle member when the distance sensor detects the distance.

Advantageous Effects of the Invention

The preview road surface detection device of a vehicle of the present invention can detect a displacement of a road surface with high accuracy, even when a tire of the vehicle is deformed during a turn, which makes it possible to preview control an active suspension and to improve a ride comfort.

DETAILED DESCRIPTION OF THE EMBODIMENT

An embodiment of the present invention is described next in detail with reference to the related drawings according to the necessity.

Figure 1:
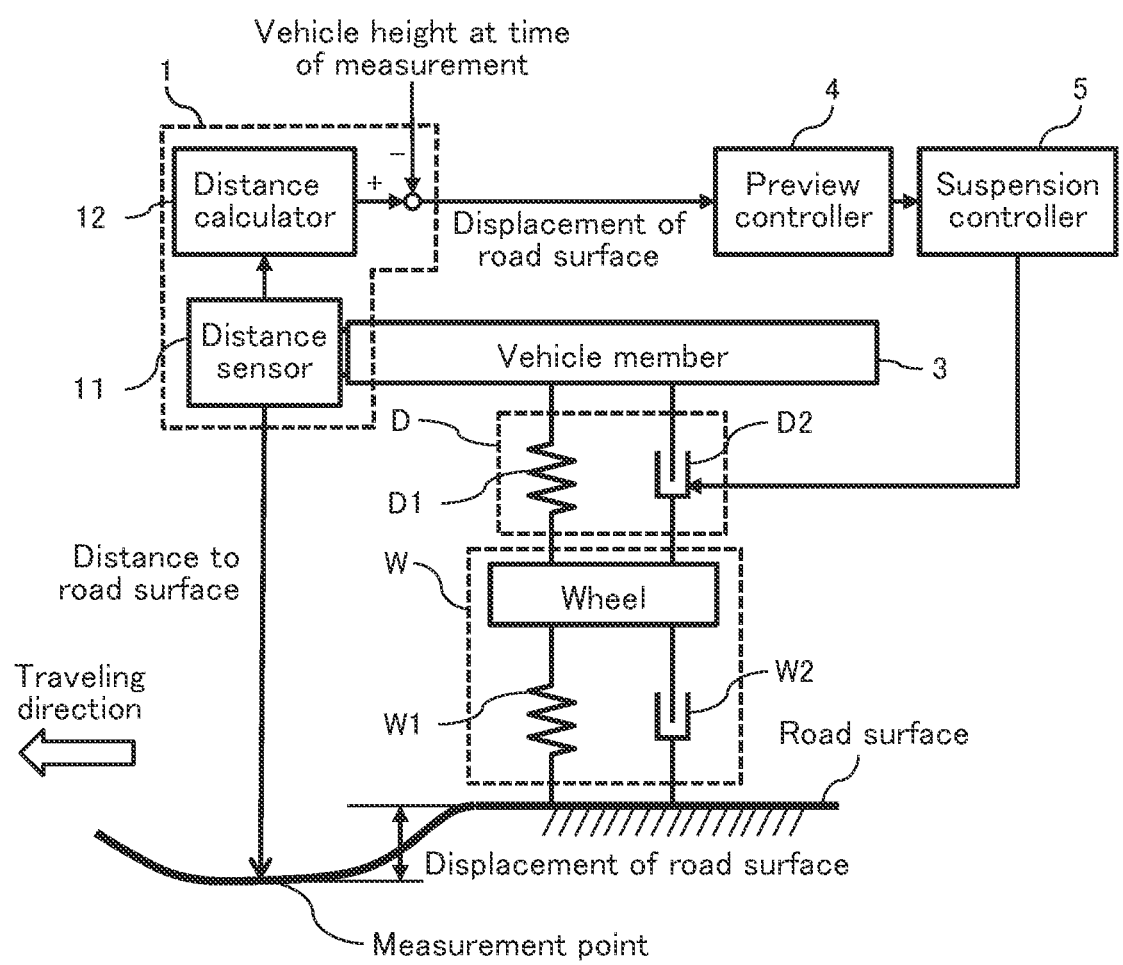
FIG. 1 is a diagram illustrating an outline of a suspension system of a vehicle according to an embodiment of the present invention.

FIG. 1 is a diagram illustrating an outline of a suspension system of a vehicle to which a preview road surface detection device 1 according to the embodiment is applied.

In the suspension system, a suspension controller 5 provides control over an active suspension D such that an attitude of a vehicle member 3 becomes stable, based on the Skyhook theory or the like. At this time, a preview controller 4: acquires a displacement of a road surface ahead of the vehicle, which is detected by the preview road surface detection device 1, as preview information; and thereby compensate for a response delay of the active suspension D, thus allowing a ride comfort to be improved.

More specifically, a wheel W (a left or a right front wheel) is provided under the vehicle member 3 which forms a vehicle body of the vehicle. An active suspension D and a tire (not illustrated) of the wheel W absorb irregularities on a road surface R. The suspension controller 5 provides control over the tire of the wheel W as an oscillatory model in which a spring W1 and a damper W2 are connected in parallel.

The active suspension D includes: a suspension spring D1; and a variable damper D2 that controls damping force using a hydraulic actuator or that controls damping force and thrust force by electromagnetic power, which are disposed in parallel. The active suspension D is disposed between the vehicle member 3 and the wheel W.

The suspension controller 5 provides control over the variable damper D2.

The preview road surface detection device 1 is installed in the vehicle member 3 and includes: a distance sensor 11 that measures a distance to each of a plurality of measurement points on the road surface R using an ultrasonic, a laser beam, or a millimeter-wave radar; and a distance calculator 12 that calculates a displacement of the road surface R ahead of the wheel W, based on a value measured by the distance sensor 11.

More specifically, the preview road surface detection device 1 calculates a displacement of the road surface R ahead of the wheel W, by subtracting a vehicle height at a time of measurement (a distance from the vehicle member 3 to the road surface R), from a value detected by the distance calculator 12. The vehicle height at the time of measurement is obtained by referring to a value calculated as a control variable by the suspension controller 5.

The preview controller 4 computes time required for the vehicle to travel to (pass through) the measurement point of the displacement of the road surface R, based on: a vehicle speed at the time of measurement of a displacement of the road surface R; and a distance from a ground contact point of the tire to the measurement point of the displacement of the road surface R in a traveling direction of the vehicle, which is obtained from a position at which the distance sensor 11 is mounted.

Each of the preview road surface detection device 1 and the preview controller 4 periodically performs processing, to thereby detect preview information of displacement of the road surface R, that is, a condition (irregularities) of the road surface R ahead of the wheel W, on which the vehicle will pass through after a lapse of a prescribed time.

The suspension controller 5 controls the active suspension D based on the preview information on displacement of the road surface R, thus allowing a ride comfort to be improved.

Next is described a mounting structure of the preview road surface detection device 1.

In the preview road surface detection device 1 according to the embodiment, the distance sensor 11 is disposed in the vehicle member 3, and the distance calculator 12 is implemented in an ECU (Electronic Control Unit) of the vehicle. How the distance sensor 11 is mounted is described below.

A mounting structure of the distance sensor 11 is illustrated in a simplified form for convenience of explanation and is not limited to this embodiment. In the following description, a "front (frontward direction)" refers to a forward traveling direction of a vehicle, a "rear (rearward direction)" refers to a reversing direction of the vehicle, an "up (upward direction)" refers to a vertically upward direction of the vehicle, a "down (downward direction)" refers to a vertically downward direction of the vehicle, and "right" and "left" directions refer to corresponding directions in a vehicle width direction (i.e., lateral direction or right-left direction) of the vehicle. Because the mounting structure of the vehicle sensor has a right-left symmetrical shape, the following description is mainly directed to one side (left side) thereof and the description of the other side (right side) is omitted where appropriate.

Figure 2:
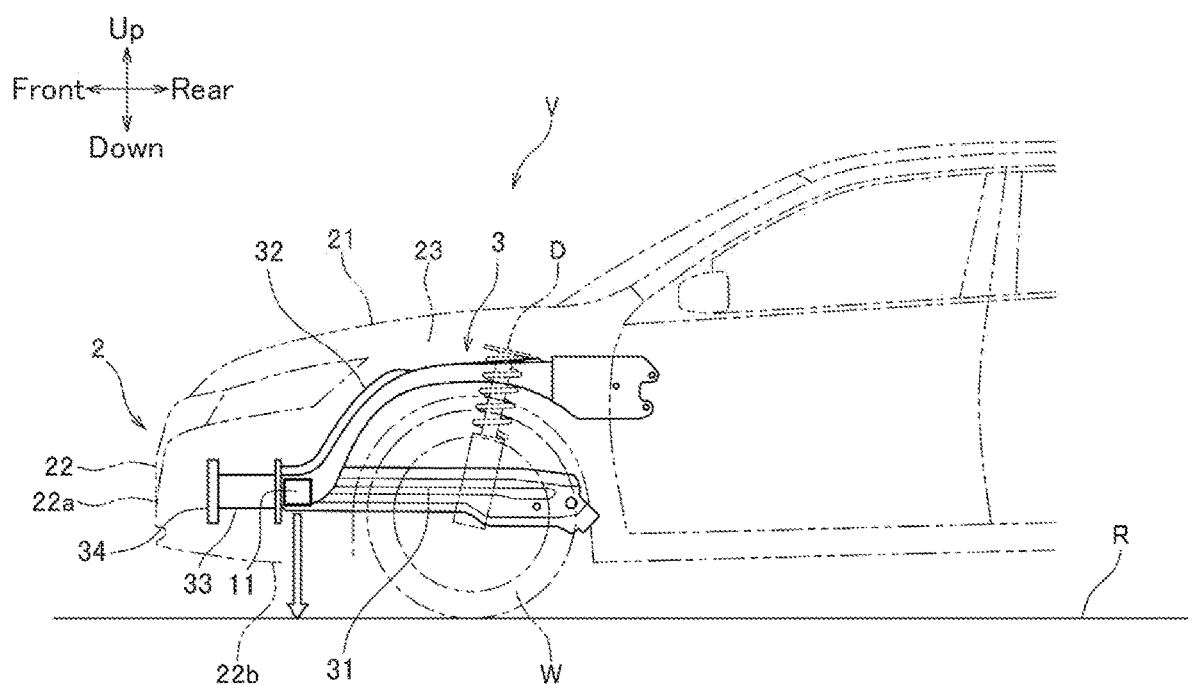
FIG. 2 is a side view illustrating a mounting structure of a distance sensor according to the embodiment.

FIG. 2 is a side view illustrating a mounting structure of the distance sensor 11 according to the embodiment of the present invention. In FIG. 2, an outline of a vehicle V is indicated by chain double-dashed lines.

As illustrated in FIG. 2, a mounting structure of distance sensor 11 is provided by fixing to the vehicle member 3 that forms the vehicle body of the vehicle.

The vehicle V includes, as major components thereof: the vehicle member 3, an exterior member 2 that forms an outer part (contour) of the vehicle V; and a distance sensor 11 that detect road surface conditions. As long as the vehicle V is an automobile equipped with the vehicle member 3, the exterior member 2, and the distance sensor 11, the type or the kind thereof is not limited. In other words, the vehicle V may be a passenger car, a bus, a truck, a work truck, or the like.

The vehicle member 3 supports the exterior member 2. The vehicle member 3 includes a front side frame 31 (a frame member), an upper member 32 (a frame member), a bumper beam extension 33, a bumper beam 34 (a frame member), and the like.

The exterior member 2 includes an engine hood 21, a front bumper 22 (a bumper), and a front fender 23. The engine hood 21 is a panel member that covers an upper surface in front of a windshield. The front bumper 22 is disposed on the front side of the vehicle V and is formed with a panel member made of, for example, synthetic resin. The front bumper 22 has a front portion 22a in which an air intake is disposed, and a bottom portion 22b which extends rearward from a lower end of the front portion 22a. The front fender 23 is a panel member that covers a periphery of the wheel W (the front left wheel).

The distance sensor 11 is a sensor that: detects a condition of the road surface R (a road surface condition) ahead of the vehicle V; and provide control over the active suspension D of the vehicle V. The distance sensor 11 is fixed to the upper member 32 positioned in front of the wheel W.

More specifically, the distance sensor 11 is mounted on an outer lateral surface of the upper member 32 in a vehicle width direction. The distance sensor 11 is positioned at a front end of the upper member 32 in a longitudinal direction.

The distance sensor 11 according to the embodiment detects a road surface distance to the road surface R immediately in front of the wheel W, as indicated by the thick solid arrow. The distance sensor 11 can be selected from sensors of various types such as a radar type, a camera type, and a laser type. The distance sensor 11 is not limited to a single sensor and may be a combination of a plurality of sensors of different types such as, for example, a camera type sensor and a laser type sensor.

Figure 3:
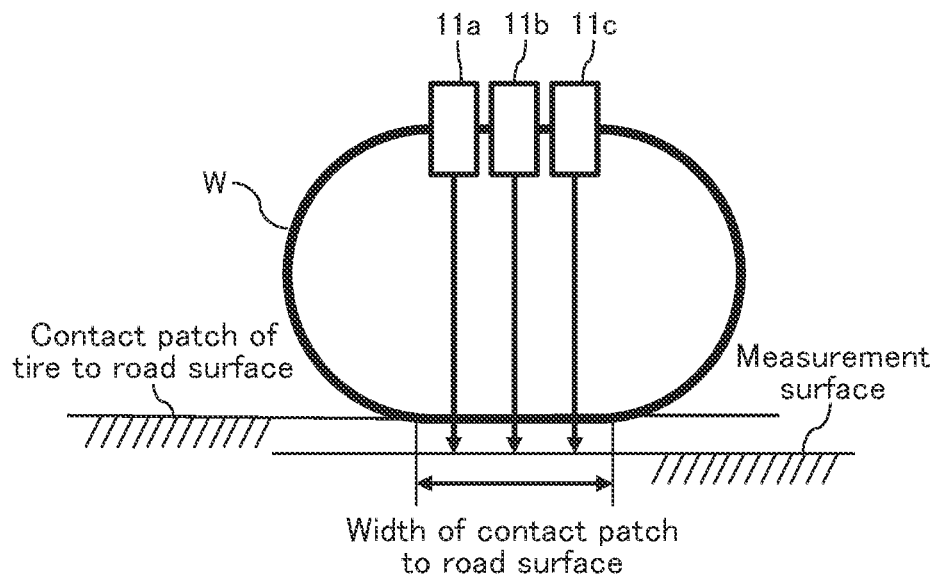
FIG. 3 is a diagram illustrating a structure of the distance sensor according to the embodiment.

Next is described the distance sensor 11 of the preview road surface detection device 1 with reference to FIG. 3.

The distance sensor 11 according to the embodiment includes three distance sensors 11a, 11b, 11c, each of which is a sensor using a triangulation method, a method of converting a reflected light intensity of emitted infrared light into a distance, a method of converting a time of flight of a laser beam into a distance.

FIG. 3 illustrates how the distance sensor 11 (11a, 11b, 11c) detect respective distances, when the wheel W is viewed from the front of the vehicle.

The wheel W hugs a contact patch of a tire on the road surface R. As illustrated in FIG. 3, each of the distance sensors 11a, 11b, 11c detects a distance to a measurement point (to a tip of each of the arrows) on a measurement surface ahead of the vehicle, which corresponds to a center or a point a prescribed width apart from the center within the contact patch width of the wheel W. Even when a steering angle operation such as cornering causes a change in a load applied to the wheel W, a tire thereby deforms, and a width of contact patch to the road surface R varies, the detection of the distances by the distance sensors 11a, 11b, 11c makes it possible for the preview road surface detection device 1 to calculate displacement of the road surface R. That is, the preview road surface detection device 1 does not take a point at a position corresponding to an end of the road surface contact patch width of the tire, at which the tire is crushed or off the ground, as a measurement point. More specifically, a position of the measurement point is preferably situated at the central portion of the road surface contact patch width of the wheel W or a point a prescribed width apart from the central portion within the road surface contact patch width, when the vehicle is placed on a flat road surface without any occupant therein.

The distance calculator 12 (see FIG. 1) of the preview road surface detection device 1: calculates an average value of respective distances detected by the distance sensors 11a, 11b, 11c; and takes the calculated average value as a road surface distance. FIG. 3 illustrates three units of the distance sensors 11a, 11b, 11c and description is made assuming that an average value of respective distances to the three measurement points. In the present invention, however, distances to at least two measurement points are detected. This can improve accuracy in detecting displacement of a road surface.

In the explanation above, a case is described in which, even when a load applied to the wheel W varies, each of the distance sensors 11a, 11b, 11c calculates a distance to a road surface at a measurement point ahead of the vehicle, corresponding to the central portion of the contact patch width of the road surface which the tire hugs or a point a prescribed width apart from the central portion within the road surface contact patch width. Next is described another case with reference to FIG. 4, in which the distance calculator 12 calculates a road surface distance at a measurement point ahead of the vehicle depending on variation of a load applied to the wheel W (a change in a road surface contact patch width).

Figure 4:
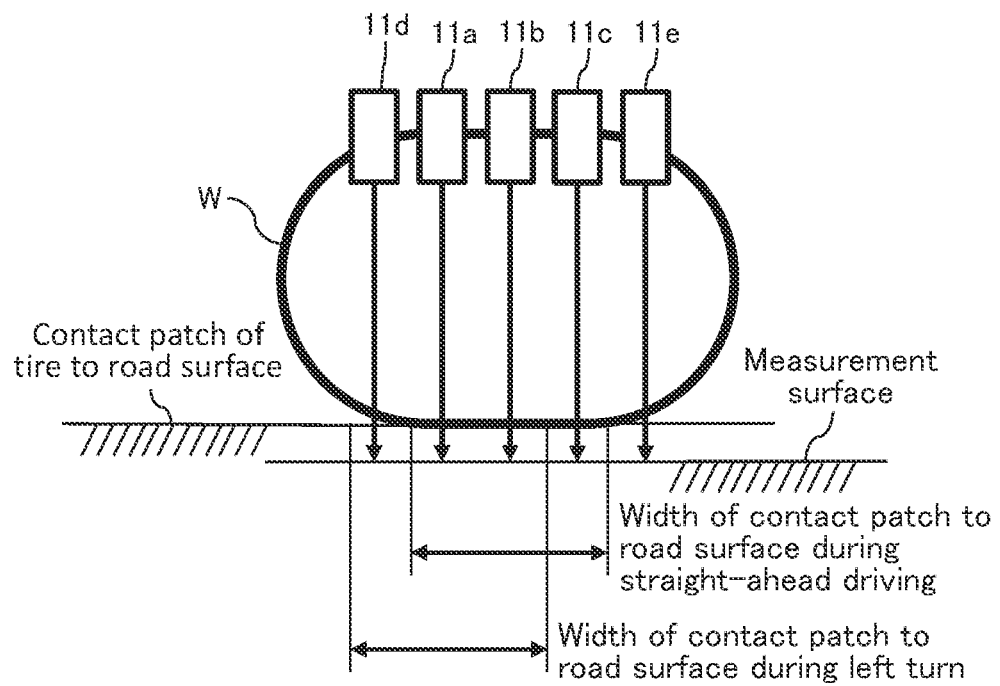
FIG. 4 is a diagram illustrating another structure of the distance sensor according to the embodiment.

FIG. 4 illustrates how the distance sensors 11 (11a, 11b, 11c, 11d, 11e) detect respective road surface distances, when the wheel W is viewed from the front of the vehicle. In FIG. 4, the distance sensors 11d, 11e are newly added such that the distance sensors 11 can additionally detect a distance at a measurement point ahead of the vehicle corresponding to a point at which a tire of interest hugs a road surface when a load applied to the wheel W varies.

In the preview road surface detection device 1, let Xa, Xb, Xc, Xd, Xe, be respective distances measured by the distance sensors 11a, 11b, 11c, 11d, 11e, and also let wa, wb, wc, wd, we, be respective weights of the distances measured by the distance sensors 11a, 11b, 11c, 11d, 11e. The distance calculator 12 calculates (wa×Xa+wb×Xb+wc×Xc+wd×Xd+we×Xe)/(wa+wb+wc+wd+we) and obtains the calculated result as a road surface distance. That is, the distance calculator 12 takes a weighted average value of the distances detected by the distance sensor 11 as the road surface distance.

When the vehicle is traveling straight ahead, the distance calculator 12: increases the weights wa, wb, wc, of the distance sensors 11a, 11b, 11c, corresponding to a central portion of the road surface contact patch width; decreases the weights wd, we, of the distance sensors 11d, 11e; and thereby calculates a weighted average value of respective distances. For example, the weights wa, wb, wc, are set to "1" and the weights wd, we, are set to "0". A weighted average value is then calculated, and the calculated result is taken as a road surface distance.

When the vehicle is making a left turn, the distance calculator 12: increases the weights wd, wa, wb, of the distance sensors 11d, 11a, 11b, corresponding to a right side of the road surface contact patch width (on a right side in the vehicle traveling direction); decreases the weights wc, we, of the distance sensors 11c, 11e; and thereby calculates a weighted average value of respective distances. For example, the weights wd, wa, wb, are set to "1" and the weights wc, we, are set to "0". A weighted average value is then calculated, and the calculated result is taken as a road surface distance.

When the vehicle is making a right turn, the distance calculator 12: increases the weights wb, wc, we, of the distance sensors 11b, 11c, 11e, corresponding to a left side of the road surface contact patch width (on a left side in the vehicle traveling direction); decreases the weights wd, wa, of the distance sensors 11d, 11a; and thereby calculates a weighted average value of respective distances. For example, the weights wb, wc, we, are set to "1" and the weights wd, wa, are set to "0". A weighted average value is then calculated, and the calculated result is taken as a road surface distance.

In other words, the preview road surface detection device 1: adds a weight to each of a plurality of distances ahead of a wheel, detected by the distance sensor 11; and thereby calculates a weighted average value as a road surface distance. This makes it possible to adjust weights such that, when the vehicle makes a turn, an outer peripheral side of a contact patch to a road surface has a larger weight in accordance with a turn of the vehicle.

Note that when a vehicle is making a turn, regardless of a left turn or a right turn, a centrifugal force acts more on an outer wheel of the vehicle, rather than an inner wheel thereof (a load applied to the outer wheel is larger than that to the inner wheel). Thus, while making a turn, a tire of the outer wheel crushes more than that of the inner wheel.

Focusing on a single tire, when a vehicle is making a turn, regardless of a left turn or a right turn, a centrifugal force acts more on an outer peripheral portion of the single tire, rather than an inner peripheral portion thereof (a load applied to the outer peripheral portion is larger than that to the inner peripheral portion). Thus, while making a turn, the outer peripheral portion of the same single tire crushes more than the inner peripheral portion thereof.

As described above, a road surface distance is calculated with different measurement points nearer to the front part of the vehicle, in accordance with a variation of a contact patch width to a road surface of the wheel W. This can improve accuracy in detecting displacement of the road surface.

Note that the present invention is not limited to the aforementioned embodiment, and various changes in design can be made without departing from the gist of the invention.

DESCRIPTION OF REFERENCE NUMERALS 1 preview road surface detection device
11 distance sensor
12 distance calculator
2 exterior member
3 vehicle member
D active suspension
D1 suspension spring
D2 variable damper
W wheel
W1 spring
W2 damper
4 preview controller
5 suspension controller

The invention claimed is:
1. A preview road surface detection device of a vehicle, comprising:
a distance sensor that is disposed in a vehicle member and detects a distance to a measurement point on a road surface in a frontward direction of the vehicle, the measurement point corresponding to at least a central portion of a contact patch to the road surface of a wheel of the vehicle; and a distance calculator that calculates a road surface distance from the vehicle member to the measurement point, based on a value detected by the distance sensor, wherein a displacement of the road surface nearer to the front part of the vehicle is detected as a road surface condition, the displacement of the road surface being calculated from the road surface distance and a vehicle height of the vehicle member when the distance sensor detects the distance, wherein the distance sensor detects respective distances to at least two measurement points, and wherein the distance calculator:
- adds respective weights to a plurality of the distances ahead of the wheel detected by the distance sensor and calculates a weighted average value as a road surface distance;
- when the vehicle is traveling straight ahead, increases a weight to the distance corresponding to a central portion of the road surface contact patch;
- when the vehicle is making a right turn, increases a weight to the distance corresponding to a left side of the road surface contact patch; and
- when the vehicle is making a left turn, increases a weight to the distance corresponding to a right side of the road surface contact patch.

* * * * *